Dec. 6, 1966  F. A. ZIHERL ETAL  3,290,062

COMPRESSION FITTING

Filed March 18, 1964

INVENTORS
FRANK A. ZIHERL
BY ARTHUR S KISH

ATTORNEYS

United States Patent Office 3,290,062
Patented Dec. 6, 1966

3,290,062
COMPRESSION FITTING
Frank A. Ziherl, Richmond Heights, and Arthur S. Kish, Lyndhurst, Ohio, assignors to Z & W Manufacturing Corp., Wickliffe, Ohio, a corporation of Ohio
Filed Mar. 18, 1964, Ser. No. 352,776
3 Claims. (Cl. 285—3)

This invention relates, as indicated, to compression fittings, but has reference more particularly to fittings of the type in which a sleeve portion of a nut member is ruptured from the nut member and is then locked to the tube which is coupled to a body member by the nut member.

Fittings of this general type are disclosed, by way of example, in Patents 1,755,210; 1,889,778; 2,182,811; 2,460,621; 2,497,274; 2,544,109; 2,553,981; 2,641,489 and 3,025,084.

In many cases, such fittings are difficult to assemble and bring to fully compressed position, for various reasons, including (a) difficulty in properly rupturing the sleeve from the nut member, (b) difficulty in moving the nut member and sleeve after such rupturing, (c) difficulty in avoiding binding between the surfaces of some of the parts during assembly, and (d) difficulty in separating the nut member from the sleeve during disassembly.

The present invention has, as its primary object, the provision of a compression fitting of the character described, in which the sleeve portion of the nut member can be easily ruptured or broken away from the nut member.

Another object of the invention is to provide a compression fitting of the character described, in which frictional resistance to movement of the nut member after the sleeve has been broken away is reduced to a minimum, thereby accelerating and facilitating the compression of the sleeve.

A further object of the invention is to provide a compression fitting of the character described, in which binding between the sleeve and certain portions of the body member is avoided.

A still further object of the invention is to provide a compression fitting of the character described, in which the construction is such that the nut member can be easily and quickly removed when the parts of the fitting are to be disassembled.

Other objects and advantages of our invention will be apparent during the course of the following description.

Figure 1:
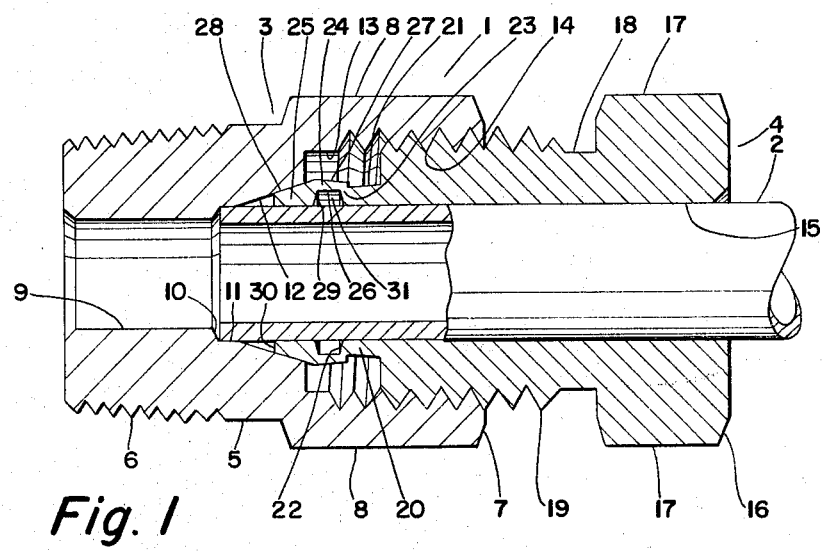
Figure 2:
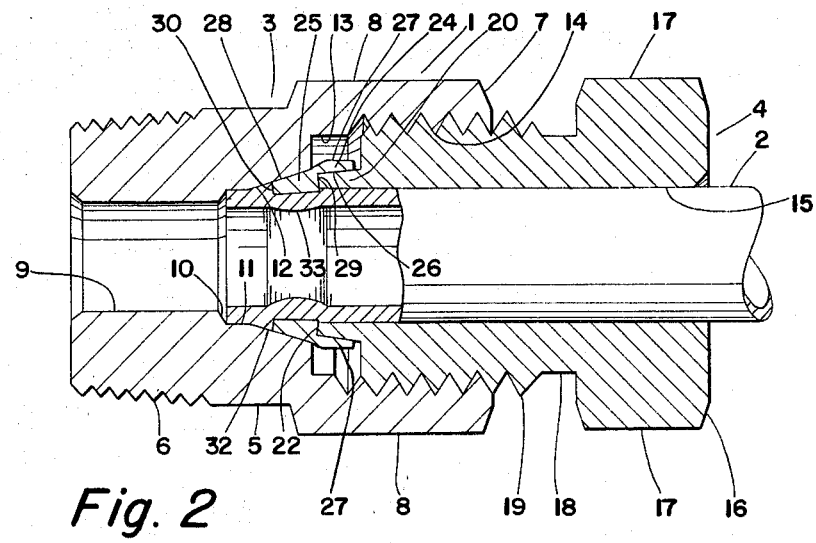

In the accompanying drawing forming a part of this specification, and in which like numerals are employed to designate like parts throughout the same, FIG. 1 is a longitudinal cross-sectional view of a fitting embodying the invention, and showing the parts in the "approach" position, and FIG. 2 is a view similar to FIG. 1, but showing the parts in the "compressed" position.

Referring more particularly to the drawings, there is disclosed a fitting generally designated by reference numeral 1, which is shown as secured to one end of a tube 2.

The fitting 1 comprises a generally tubular body member 3, and a generally tubular nut member 4.

The body member 3 is preferably formed of a relatively rigid material such as brass, aluminum, steel, or certain of the plastics, and is provided with an inner end 5, having means, such as an externally-threaded portion 6, for attachment of the body member to an element such as a fitting. The outer end 7 of body member 3 is provided with a plurality of flat surfaces 8 for coaction with a tool such as a wrench.

Extending through the body member 3 is a passage defined by a cylindrical surface 9, a conical surface 10, a short cylindrical surface 11 of somewhat larger diameter than the surface 9, a conical surface 12, and a cylindrical surface 13 of larger diameter than the surface 11, and a portion of which is threaded, as at 14.

The tubular nut member 4 has a passage 15 extending therethrough for passage of the tube 2, and comprises an outer end 16 provided with a plurality of flat surfaces 17 for coaction with a tool such as a wrench.

The nut member 4 further comprises a stem portion 18, of reduced diameter, provided with external threads 19, which are adapted for securement to the threads 14, in the assembly of the nut member with the body member.

Extending from the stem portion 18 of the nut member is a short portion 20 which has a conical outer surface 21 having an inclination of about 5° to the axis of the nut member, and a conical end surface 22 having an inclination of about 88° to the axis of the nut member.

Connected integrally to the portion 20 of the nut member, as by a web 23 (FIG. 1), is a sleeve consisting of a portion 24 and a portion 25. The portion 24 has an inner cylindrical surface 26 in spaced relation to the outer wall of the tube 2, and an outer conical surface 27 which has an inclination of about 5° to the axis of the nut member, but inclined oppositely to the inclination of the surface 21. The portion 25 of the sleeve has an outer conical surface 28 inclined at an angle of about 15° to the axis of the nut member, a rear conical surface 29 inclined at an angle of about 88° to the axis of the nut member, and a front end surface 30 which is perpendicular to the axis of the nut member. The angle of inclination of the surface 28 corresponds with the angle of inclination of the surface 12 of the body member.

In assembling the body member, nut member, and tube 2, in the manner shown in FIG. 1, which may be termed the "approach" position, the tube 2 is brought into abutment with the conical surface 10 of the body member, which surface thus serves as a shoulder to limit further movement of the tube into the body member. The nut member 4 is threaded into the body member until the portion 25 of the sleeve is brought to the position shown in FIG. 1. This positioning of the parts may be accomplished manually, since, up to this point, there is little or no resistance to movement of the nut member.

Upon further rotation of the nut member, the resistance to such turning interposed by the surface 12 of the body member, causes the web 23 to become ruptured, thus separating the nut member from the sleeve consisting of the portions 24 and 25.

Continued rotation of the nut member then causes the portion 20 of the nut member to enter the space 31 between the outer wall of the tube 2 and the cylindrical surface 26 of the sleeve, this movement continuing until the end surface 22 abuts the surface 29 of the sleeve. After this, the wedging action resulting from the reaction upon each other of the surfaces 12 and 28, and the surfaces 21 and 26, causes the portion 25 of the sleeve to bite into the outer surface of the tube 2 to thereby lock the sleeve to the tube. This "biting" action causes a portion of the tube 2 to be displaced outwardly, as at 32, and a portion of the tube to be displaced inwardly, as at 33, as shown in FIG. 2, this figure showing what may be termed the "compressed" position.

Due to the inclination of the surface 21, the web 23 is easily ruptured, and after such rupture, the surface 21 easily slides on the ruptured rear inner edge of the portion 24 of the sleeve, since the cylindrical surface 26 interposes no frictional resistance to such sliding movement, and as a result, the end surface 22 is quickly brought into abutment with the end surface 29. The locking action of the sleeve, resulting from further rotation of the nut member is thus accelerated. In prior art fittings of this type, there is a tendency for the rupturing to occur along the portion 24 of the sleeve.

Due to the inclination of the surfaces 22 and 29, the areas of these surfaces are increased slightly. This produces an increase in the area of compression engagement between these surfaces, and facilitates the assembly of the parts.

Due to the inclination of the surface 21, the portion 20 of the nut member 4 causes the portion 24 of the sleeve to be moved radially outwardly, until, in the position shown in FIG. 2, the cylindrical surface 26 has been inclined at the same angle to the axis of the nut member, as is the surface 21, and the surface 27 is substantially concentric with the axis of the nut member. As a result, the nut member may be easily separated from the sleeve, when the parts are to be disassembled, since there is no binding between the surfaces 21 and 26 to resist such separation. Moreover, in cases where the parts are so dimensioned that the portion 24 of the sleeve is very close to the surface 13 of the body member, the provision of the inclined surface 27 prevents this surface from binding against the surface 13 during assembly of the parts, as would be the case if the surface 27 were cylindrical prior to the spreading of the portion 24 of the sleeve, as shown in FIG. 2.

It is to be understood that the form of our invention, herewith shown and described, is to be taken as a preferred example of the same, and that various changes may be made in the shape, size and arrangement of parts thereof, without departing from the spirit of the invention or the scope of the subjoined claims.

Having thus described our invention, we claim:

1. In a compression fitting of the character described, a body member having an internal abutment for one end of a tube which is adapted to be secured to said body member and which tube is initially in engagement with said abutment, said body member having a conical inner surface adjacent said abutment, and a nut member threadedly secured to said body member, said nut member having a forward portion embracing said tube, and a sleeve integrally connected to said forward portion, said sleeve comprising a rear section having its inner surface in spaced relation to the outer wall of said tube whereby to provide a space adapted to receive said forward portion of the nut member, and a front section in engagement with said tube and having an outer surface in engagement with said conical inner surface of said body member, said forward portion of the nut member being joined to the rear section of the sleeve by a rupturable connection extending from the rear section of said sleeve to the radially outer face of said forward portion of the nut member and rupturable upon movement of said nut member towards said body member and said forward portion of the nut member being of a length greater than the length of said sleeve rear section whereby continuing movement of the nut member relatively to said body member causes said forward portion of the nut member to enter said space and exert pressure on the front section of the sleeve of the nut member, whereby said front section is moved forwardly to be contracted in diameter by said concial inner surface to lock said front section to said tube.

2. A compression fitting, as defined in claim 1, wherein the forward portion of the nut member has a conical outer surface, whereby after said rupture and during movement of said forward portion through said space, said conical outer surface slides on only the rear edge of said rear section, so that friction between said forward portion and said rear section is reduced and movement of said forward portion toward the front section of the sleeve is facilitated.

3. A compression fitting, as defined in claim 1, in which said forward portion of said nut member terminates in a substantially radial surface which is inclined at an angle of slightly less than 90 degrees to the axis of the nut member, and the front section of said sleeve has a rear substantially radial surface inclined at an angle of slightly less than 90 degrees to the axis of the nut member, but oppositely to the inclination of said terminal surface of said forward portion.

References Cited by the Examiner
UNITED STATES PATENTS

| 1,927,464 | 9/1933 | McIntosh | 285—342 X |
| 3,079,182 | 2/1963 | Appleton | 285—343 |
| 3,250,550 | 5/1966 | Lyon | 285—3 |

CARL W. TOMLIN, *Primary Examiner.*